United States Patent
Majima et al.

(10) Patent No.: US 12,425,261 B2
(45) Date of Patent: Sep. 23, 2025

(54) COMMUNICATION DEVICE, COMMUNICATION SYSTEM, AND COMMUNICATION CONTROL METHOD

(71) Applicant: Panasonic Intellectual Property Management Co., Ltd., Osaka (JP)

(72) Inventors: Yosuke Majima, Osaka (JP); Hayata Sakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 130 days.

(21) Appl. No.: 18/551,654

(22) PCT Filed: Dec. 20, 2021

(86) PCT No.: PCT/JP2021/046950
§ 371 (c)(1),
(2) Date: Sep. 21, 2023

(87) PCT Pub. No.: WO2022/209054
PCT Pub. Date: Oct. 6, 2022

(65) Prior Publication Data
US 2024/0171422 A1    May 23, 2024

(30) Foreign Application Priority Data
Mar. 31, 2021 (JP) .................. 2021-061519

(51) Int. Cl.
*H04L 12/28* (2006.01)
*H04L 12/42* (2006.01)

(52) U.S. Cl.
CPC ............ *H04L 12/28* (2013.01); *H04L 12/422* (2013.01)

(58) Field of Classification Search
None
See application file for complete search history.

(56) References Cited

U.S. PATENT DOCUMENTS

| 5,990,638 A | 11/1999 | Aoyama et al. |
| 6,199,169 B1 * | 3/2001 | Voth ............... G06F 1/14 713/400 |

(Continued)

FOREIGN PATENT DOCUMENTS

| EP | 3089401 A1 * | 11/2016 | ........... H04L 12/403 |
| EP | 4084417 A1 | 11/2022 | |

(Continued)

OTHER PUBLICATIONS

The EPC Office Action dated Sep. 3, 2024 for the related European Patent Application No. 21935203.6.

(Continued)

*Primary Examiner* — Lance Leonard Barry
(74) *Attorney, Agent, or Firm* — Rimon P.C.

(57) ABSTRACT

Communication device is a communication device to which a plurality of slaves are daisy-chained and which communicates with the plurality of slaves. Communication device includes processor. Processor executes setting processing. In the setting processing, an update cycle of a specific slave that is a slave having a shortest data update cycle among the plurality of slaves is set to a reference cycle, and an update cycle of another slave different from specific slave among the plurality of slaves is set to an integral multiple of the reference cycle.

17 Claims, 7 Drawing Sheets

(56) References Cited

U.S. PATENT DOCUMENTS

| | | | |
|---|---|---|---|
| 2002/0027682 A1* | 3/2002 | Iwasaki | H04Q 11/0062 |
| | | | 398/58 |
| 2013/0297897 A1 | 11/2013 | Sano et al. | |
| 2014/0368623 A1* | 12/2014 | Seo | H04N 13/341 |
| | | | 348/54 |
| 2016/0344653 A1* | 11/2016 | Kiribuchi | H04L 12/403 |

FOREIGN PATENT DOCUMENTS

| | | | | |
|---|---|---|---|---|
| EP | 4187857 A1 | 5/2023 | | |
| JP | 05-244218 | 9/1993 | | |
| JP | 10-013394 | 1/1998 | | |
| JP | 2013-172334 | 9/2013 | | |
| JP | 2015-154280 | 8/2015 | | |
| WO | 2012/114525 | 8/2012 | | |
| WO | WO-2014083806 A1 * | 6/2014 | | G06F 9/5061 |

OTHER PUBLICATIONS

International Search Report of PCT application No. PCT/JP2021/046950 dated Feb. 8, 2022.

* cited by examiner

COMMUNICATION DEVICE, COMMUNICATION SYSTEM, AND COMMUNICATION CONTROL METHOD

CROSS-REFERENCE TO RELATED APPLICATIONS

This application is a U.S. national stage application of the PCT International Application No. PCT/JP2021/046950 filed on Dec. 20, 2021, which claims the benefit of foreign priority of Japanese patent application No. 2021-061519 filed on Mar. 31, 2021, the contents all of which are incorporated herein by reference.

TECHNICAL FIELD

The present disclosure generally relates to a communication device, a communication system, a communication control method, and a program. More specifically, the present disclosure relates to a communication device, a communication system, a communication control method, and a program that communicate with a plurality of slaves.

BACKGROUND ART

PTL 1 describes a data transmission system (communication system) to which a frame configuration of cyclic transmission is applied. The data transmission system described in PTL 1 includes a control sequencer (communication device) and a controlled drive device (slave). The control sequencer and the controlled drive device are connected to each other via a data transmission line.

The data transmission system described in PTL 1 cyclically transmits a data frame including data requiring high-speed communication and data requiring low-speed communication.

CITATION LIST

Patent Literature

PTL 1: Unexamined Japanese Patent Publication No. H5-244218

SUMMARY OF THE INVENTION

In the data transmission system described in PTL 1, for example, in a case where a plurality of controlled drive devices having different data update cycles are daisy-chained to the control sequencer, a communication cycle is adjusted to a communication cycle of a controlled drive device having a shortest update cycle. Consequently, there is a problem that a controlled drive device having a long update cycle has over-specifications and as a result, communication efficiency decreases.

An object of the present disclosure is to provide a communication device, a communication system, a communication control method, and a program capable of improving communication efficiency.

A communication device according to one aspect of the present disclosure is a communication device to which a plurality of slaves are daisy-chained and which communicates with the plurality of slaves. The communication device includes a processor. The processor executes setting processing. In the setting processing, an update cycle of a specific slave that is a slave having a shortest data update cycle among the plurality of slaves is set to a reference cycle, and an update cycle of another slave different from the specific slave among the plurality of slaves is set to an integral multiple of the reference cycle.

A communication system according to another aspect of the present disclosure includes the communication device and the plurality of slaves. The plurality of slaves are connected to the communication device and communicate with the communication device.

A communication control method according to still another aspect of the present disclosure is a communication control method used in a communication device to which a plurality of slaves are daisy-chained and which communicates with the plurality of slaves. The communication control method includes a setting step. In the setting step, an update cycle of a specific slave that is a slave having a shortest data update cycle among the plurality of slaves is set to a reference cycle, and an update cycle of another slave different from the specific slave among the plurality of slaves is set to an integral multiple of the reference cycle.

A program according to still another aspect of the present disclosure is a program for causing one or more processors to execute the communication control method.

According to the communication device, the communication system, the communication control method, and the program according to the above aspects of the present disclosure, communication efficiency can be improved.

DESCRIPTION OF EMBODIMENT

(1) Outline

Figure 1:
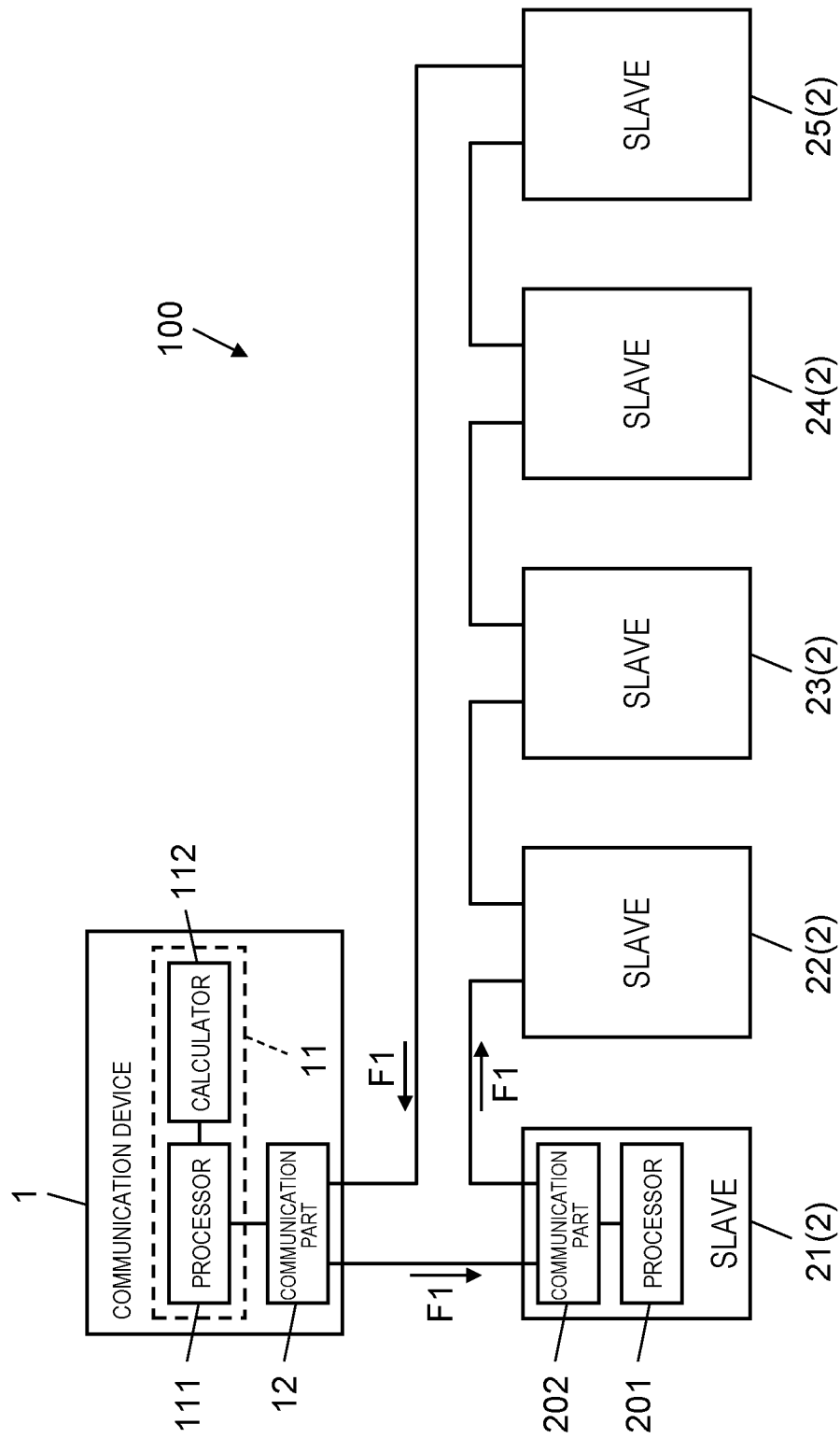
FIG. 1 is a block diagram illustrating an outline of a communication system including a communication device according to an exemplary embodiment.
Figure 3:
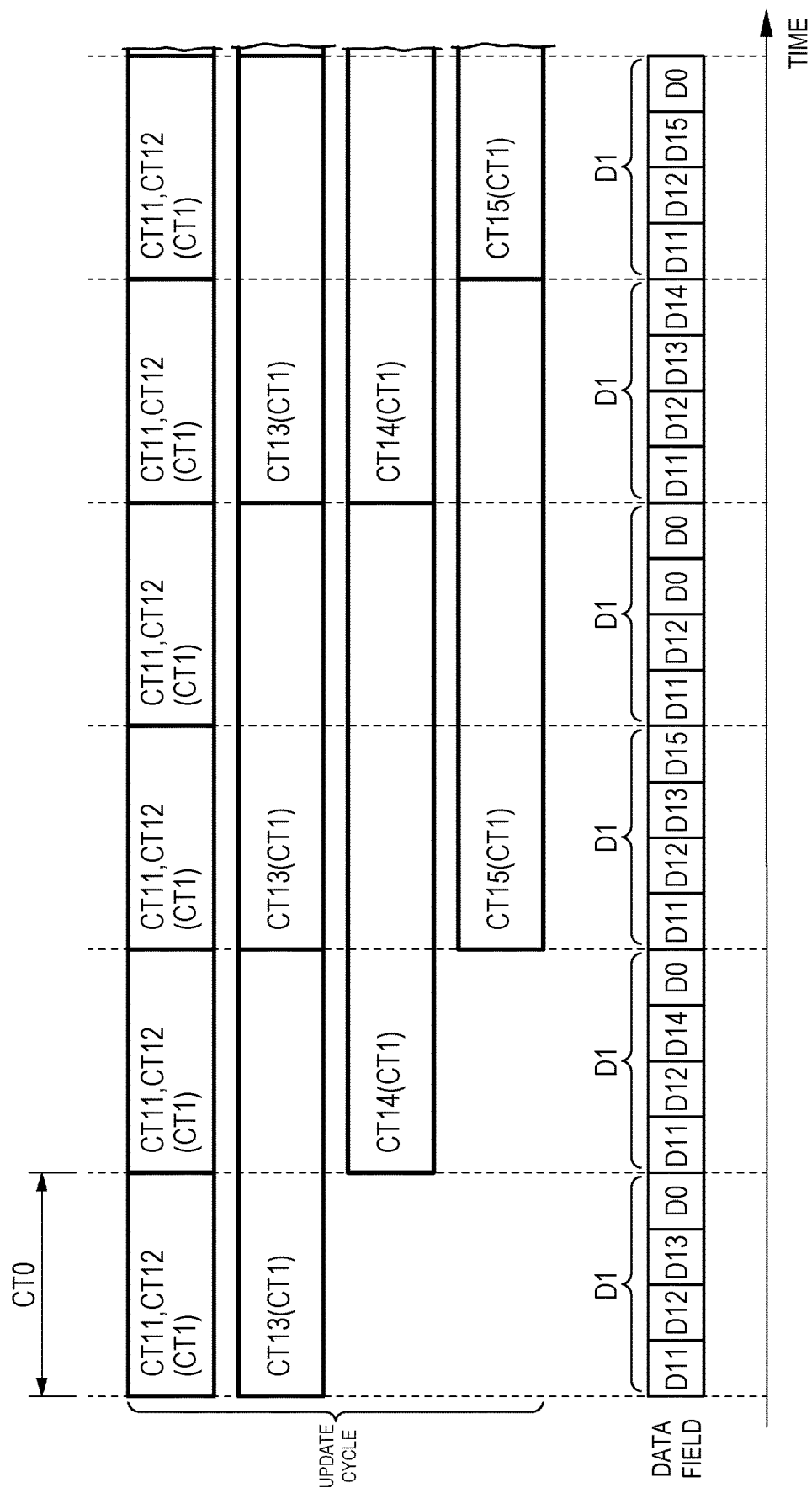
FIG. 3 is an explanatory diagram of an update cycle of each slave in the communication system and a data field of a frame transmitted from the communication device.

FIG. 1 is a block diagram illustrating an outline of communication system 100 having communication device 1 according to an exemplary embodiment. FIG. 3 is an explanatory diagram of an update cycle of each slave in communication system 100 and a data field of a frame transmitted from communication device 1.

As illustrated in FIG. 1, communication device 1 according to the present exemplary embodiment constitutes communication system 100 together with a plurality of (for example, five) slaves 2 connected to communication device 1. That is, communication device 1 is a master corresponding to a host device of the plurality of slaves 2. Communication device 1 and the plurality of slaves 2 are connected to an identical network. That is, communication system 100 includes communication device 1 and the plurality of slaves 2. The plurality of slaves 2 are connected to communication device 1 and communicate with communication device 1.

In the present exemplary embodiment, communication device 1 and the plurality of slaves 2 are connected to industrial network. The "industrial network" in the present disclosure is, for example, a field network used in factory automation and is used for communication between a plurality of devices installed in a factory. The industrial network may include, for example, Ethernet/internet protocol (Ethernet/IP) (registered trademark), Ether for Control Automation Technology (EtherCAT: registered trademark), or PROFINET (registered trademark). The device connected to the industrial network may include, for example, a controller (for example, a programmable logic controller (PLC)), a sensor (for example, a displacement sensor, a flowmeter, a pressure gauge, or an image sensor), or a remote input and output (I/O). In addition, the device connected to the industrial network may include, for example, a servo amplifier, an inverter, a robot, an actuator, or a valve.

The industrial network is required to have robustness, punctuality, and real time property as compared with standard best-effort networks used in offices and the like. For example, in the industrial network, in a case where control data is periodically transmitted from a controller to a device to be controlled such as a servo amplifier, a delay is not allowed as compared with the best-effort network, and an increase in response speed to the control data is required.

Communication device 1 according to the present exemplary embodiment is a communication device to which the plurality of slaves 2 are daisy-chained and which communicates with the plurality of slaves 2. As illustrated in FIG. 1, communication device 1 includes processor 111. Processor 111 executes setting processing.

The setting processing is processing of setting update cycle CT1 (see FIG. 3) of each of the plurality of slaves 2. That is, communication device 1 sets update cycle CT1 of each of the plurality of slaves 2 by executing the setting processing. More specifically, in the setting processing, update cycles CT1 of specific slaves 2 (here, first slave 21 and second slave 22 to be described later) which are the slaves having shortest data update cycle CT1 among the plurality of slaves 2, are set to reference cycle CT0 (see FIG. 3). In addition, in the setting processing, update cycles CT1 of other slaves 2 (here, third slave 23, fourth slave 24, and fifth slave 25 to be described later) different from specific slaves 2 among the plurality of slaves 2 are set to an integral multiple of reference cycle CT0.

In communication device 1 according to the present exemplary embodiment, as described above, update cycles CT1 of specific slaves 2 are set to reference cycle CT0, and update cycles CT1 of other slaves 2 are set to an integral multiple of reference cycle CT0. Consequently, other slaves 2 do not have over-specifications, and communication efficiency can be improved. In addition, update cycles CT1 can be divided into specific slaves 2 that require relatively high-speed control and other slaves 2 that do not require relatively high-speed control, and as a result, efficiency of arithmetic processing of communication device 1 can be improved.

(2) Details

Hereinafter, communication system 100 including communication device 1 of the present exemplary embodiment will be described in detail with reference to FIG. 1. FIG. 1 is a block diagram illustrating an outline of communication system 100 having communication device 1 according to the present exemplary embodiment. In the present exemplary embodiment, the plurality of (for example, five) slaves 2 are connected to communication device 1. In addition, in the present exemplary embodiment, the plurality of slaves 2 are daisy-chained to communication device 1. Specifically, first slave 21, second slave 22, third slave 23, fourth slave 24, and fifth slave 25 are connected to communication device 1 in this order in a ring shape. Thus, in the present exemplary embodiment, frame F1 transmitted from communication device 1 is transferred to first slave 21, second slave 22, third slave 23, fourth slave 24, fifth slave 25, and communication device 1 in this order.

In addition, in communication system 100 according to the present exemplary embodiment, among the plurality (five) of slaves 2, two slaves 2 are servo amplifiers, and three slaves 2 are sensors. Specifically, first slave 21 and second slave 22 are servo amplifiers, and third slave 23, fourth slave 24, and fifth slave 25 are sensors. In addition, in communication system 100 according to the present exemplary embodiment, communication device 1 is a controller that individually or entirely controls the plurality of slaves 2 (that is, a plurality of servo amplifiers and sensors).

(2.1) Communication Device

As illustrated in FIG. 1, communication device 1 includes controller 11 and communication part 12. In the present exemplary embodiment, communication device 1 stores data in a memory included in controller 11, but may include a storage separately from controller 11. Examples of the storage are an electrically rewritable nonvolatile memory such as an electrically erasable programmable read-only memory (EEPROM), and a volatile memory such as a random access memory (RAM).

Controller 11 includes, for example, a computer system. The computer system mainly includes a processor and a memory as hardware. A function as controller 11 (including processor 111 and calculator 112 to be described later) is implemented by a processor executing a program recorded in a memory of the computer system. The program may be recorded in advance in the memory of the computer system, may be provided through a telecommunication line, or may be provided by being recorded in a non-transitory recording medium such as a memory card, an optical disk, or a hard disk drive readable by the computer system.

Communication part 12 is a communication interface for communicating with the plurality of slaves 2. Communication part 12 includes, for example, a wired communication module conforming to an industrial Ethernet (registered trademark) protocol. Communication part 12 transmits frame F1 to communication part 202 (to be described later) of slave 2 (in FIG. 1, first slave 21) at a foremost stage directly connected to communication device 1. In addition, communication part 12 receives frame F1 transmitted from communication part 202 of slave 2 (in FIG. 1, fifth slave 25) at a rearmost stage directly connected to communication device 1.

As illustrated in FIG. 1, controller 11 includes processor 111 and calculator 112. That is, communication device 1 includes processor 111 and calculator 112.

Processor 111 has a function of executing communication processing and setting processing. In addition, processor 111 further has a function of executing calculation processing.

The communication processing is processing of causing communication part 12 to transmit frame F1 to the plurality of slaves 2 in reference cycle CT0 (see FIG. 3). As will be described later, reference cycle CT0 is set based on update cycles CT1 (see FIG. 3) of the plurality of slaves 2. In the present exemplary embodiment, communication device 1 transmits frame F1 to first slave 21, and thus, frame F1 is transmitted to first slave 21, second slave 22, third slave 23, fourth slave 24, and fifth slave 25 in this order (see FIG. 1).

Figure 2:
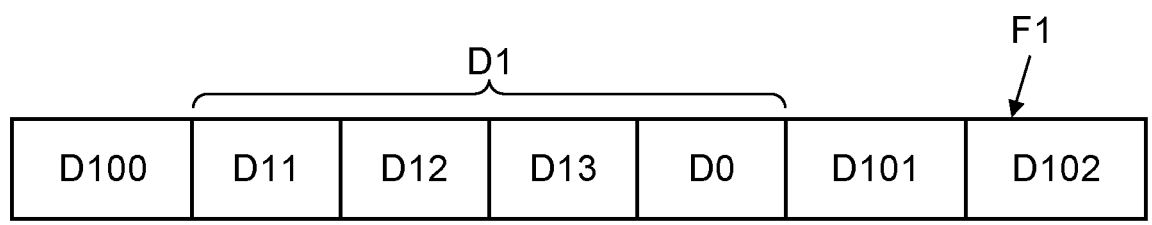
FIG. 2 is a configuration diagram illustrating an example of a frame in the communication system.

Next, frame F1 will be described. FIG. 2 is a configuration diagram illustrating an example of frame F1 in communication system 100 of the present exemplary embodiment. As illustrated in FIG. 2, frame F1 includes header D100, data region D1, result (Result) D101, and cyclic redundancy check (CRC) D102. Data region D1 is a region (slot) used for transmitting data from communication device 1 to each slave 2 and data from each slave 2 to communication device 1. That is, data from communication device 1 to each slave 2 and data from each slave 2 to communication device 1 are transmitted in data region D1.

Data region D1 includes a plurality of slots. In the example illustrated in FIG. 2, data region D1 includes four slots D11, D12, D13, and DO. Slot D11 is a slot for storing data from communication device 1 to first slave 21 and data from first slave 21 to communication device 1. Slot D12 is a slot for storing data from communication device 1 to second slave 22 and data from second slave 22 to communication device 1. Slot D13 is a slot for storing data from communication device 1 to third slave 23 and data from third slave 23 to communication device 1. Slot DO is a slot for storing unused data to be described later. That is, in the example illustrated in FIG. 2, the data of first slave 21, second slave 22, and third slave 23 can be transmitted by frame F1.

Slave 2 that has received frame F1 can acquire the data from communication device 1 by using the slot allocated to the slave in data region D1. In the example illustrated in FIG. 2, first slave 21 can acquire the data from communication device 1 by using slot D11 of data region D1. In addition, second slave 22 can acquire the data from communication device 1 by using slot D12 of data region D1. In addition, third slave 23 can acquire the data from communication device 1 by using slot D13 of data region D1. Note that, in the example illustrated in FIG. 2, slot D14 (see FIG. 3) corresponding to fourth slave 24 and slot D15 (see FIG. 3) corresponding to fifth slave 25 are not included in frame F1. Thus, fourth slave 24 and fifth slave 25 cannot receive the data from communication device 1 even though frame F1 illustrated in FIG. 2 is transmitted.

In the present exemplary embodiment, as described above, the data transmitted in communication system 100 may include the control data for each slave 2 transmitted from communication device 1 to each slave 2. In addition, the data transmitted in communication system 100 can include response data for the control data for each slave 2 transmitted from each slave 2 to communication device 1.

Here, in the present exemplary embodiment, processor 111 updates the data in each reference cycle CT0. Specifically, processor 111 generates the data to be included in next frame F1 between the start of transmission of frame F1 and the start of transmission of next frame F1. When the data is generated, processor 111 refers to, for example, command information from a host system of communication device 1, response information received from each slave 2, and the like. For example, processor 111 refers to detection information received from the sensors (third slave 23, fourth slave 24, and fifth slave 25) to generate control data for controlling the servo amplifiers (first slave 21 and second slave 22). Therefore, reference cycle CT0 needs to be set to such an extent that processing for generating the data by processor 111 can be executed, and depends on processing performance of processor 111.

The setting processing is processing of setting reference cycle CT0 used in the communication processing and update cycle CT1 of each slave 2. That is, the communication processing is executed based on a parameter set in the setting processing.

In the setting processing, processor 111 sets update cycles CT1 of specific slaves 2 having shortest data update cycle CT1 among the plurality of slaves 2 to reference cycle CT0. In addition, in the setting processing, processor 111 sets update cycles CT1 of other slaves 2 different from specific slaves 2 among the plurality of slaves 2 to an integral multiple of reference cycle CT0. This setting method will be described with reference to FIG. 3. FIG. 3 is an explanatory diagram of the update cycle of each slave 2 in communication system 100 of the present exemplary embodiment and the data field of frame F1 transmitted from communication device 1.

Specifically, in the setting processing, as illustrated in FIG. 3, processor 111 sets update cycles CT11 of first slave 21 and update cycle CT12 of second slave 22 having shortest data update cycle CT1 to reference cycle CT0. In addition, in the setting processing, as illustrated in FIG. 3, processor 111 sets update cycle CT13 of third slave 23 which is longer than update cycle CT11 of first slave 21 and update cycle CT12 of second slave 22 to twice reference cycle CT0. Furthermore, in the setting processing, as illustrated in FIG. 3, processor 111 sets update cycle CT14 of fourth slave 24 and update cycle CT15 of fifth slave 25 which are longer than update cycle CT13 of third slave 23 to three times reference cycle CT0. Each of update cycles CT11 and CT12, and reference cycle CT0 is, for example, 1 ms. Therefore, in the present exemplary embodiment, update cycle CT13 is 2 ms, and both update cycles CT14 and CT15 are 3 ms.

The calculation processing is processing of calculating an adjustment value for synchronizing communication device 1 with the plurality of slaves 2. In the calculation processing, processor 111 calculates, as the adjustment value, the sum of a first time and a second time. The first time is a processing time from when each of the plurality of slaves 2 receives frame F1 from communication device 1 or slave 2 at a previous stage directly connected to each of the plurality of slaves 2 to when a predetermined pulse is generated. The predetermined pulse is, for example, a synchronous pulse. The second time is a product of a difference value between the number of the plurality of slaves 2 and a connection order of each of the plurality of slaves 2 from communication device 1 and a fixed delay value. The fixed delay value is the sum of a delay amount of a physical layer (PHY) constituting each slave 2, a delay amount of a wiring with communication device 1 or adjacent slave 2, and an internal processing time of each slave 2. Here, since the delay amount of the wiring is sufficiently smaller than the delay amount of the PHY, the fixed delay value may be the sum of the delay amount of the PHY and the internal processing time of each slave 2. Details of the calculation processing will be described in the section of "(4) Calculation processing".

Calculator 112 calculates a maximum transmission number. In the present disclosure, the "maximum transmission number" is a maximum value of the number of slaves 2 to which data is capable of being transmitted by frame F1 transmitted from communication device 1 in each reference cycle CT0 among the plurality of slaves 2. Details of the processing of calculating the maximum transmission number by calculator 112 will be described in the section of "(3) Calculation of maximum transmission number".

In the present exemplary embodiment, processor 111 compares the number of slaves 2 corresponding to the data included in frame F1 with the maximum transmission number in each reference cycle CT0. In a case where the number of slaves 2 and the maximum transmission number are equal, processor 111 outputs frame F1 to communication part 12 as it is. On the other hand, in a case where the number of slaves 2 is smaller than the maximum transmission number, processor 111 adds the unused data to frame F1 and outputs frame F1 to which the unused data is added to communication part 12. In the present disclosure, the "unused data" is data not used in communication between communication device 1 and the plurality of slaves 2. In the present exemplary embodiment, processor 111 adds "0" as the unused data, but the unused data is not limited to "0" as long as the unused data is data not used in communication between communication device 1 and the plurality of slaves 2.

As described above, the unused data is added in a case where the number of slaves 2 is smaller than the maximum transmission number, and thus, frame lengths of frames F1 in each reference cycle CT0 can be set to be equal. As a result, communication device 1 and the plurality of slaves 2 can be synchronized. In short, processor 111 synchronizes communication device 1 with the plurality of slaves 2 by adding the unused data to frame F1.

(2.2) Slave

As illustrated in FIG. 1, each of the plurality of slaves 2 includes processor 201 and communication part 202. In the present exemplary embodiment, each of the plurality of slaves 2 stores data in a memory included in processor 201, but may include a storage separately from processor 201. The storage is an electrically rewritable nonvolatile memory such as an EEPROM, a volatile memory such as a RAM, or the like.

Processor 201 includes, for example, a computer system. The computer system mainly includes a processor and a memory as hardware. A function as processor 201 is implemented by a processor executing a program recorded in a memory of the computer system. The program may be recorded in advance in the memory of the computer system, may be provided through a telecommunication line, or may be provided by being recorded in a non-transitory recording medium such as a memory card, an optical disk, or a hard disk drive readable by the computer system.

Processor 201 executes processing based on corresponding data among a plurality of pieces of data included in frame F1 received by communication part 202. In addition, as will be described later, processor 201 may have a function of executing processing of transmitting device-to-device data to another slave 2 by using a region for storing the device-to-device data in a case where frame F1 includes the region.

Communication part 202 is a communication interface for communicating with communication device 1 or another slave 2. Communication part 202 includes, for example, a wired communication module conforming to an industrial Ethernet (registered trademark) protocol. Communication part 202 receives frame F1 transmitted from communication part 12 of communication device 1 or communication part 202 of slave 2 at the previous stage directly connected to slave 2. In addition, communication part 202 transmits received frame F1 to communication part 12 of communication device 1 at a subsequent stage directly connected to slave 2 or communication part 202 of slave 2. As an example, communication part 202 of first slave 21 receives frame F1 transmitted from communication part 12 of communication device 1, and transmits received frame F1 to communication part 202 of second slave 22. At this time, communication part 202 of first slave 21 may appropriately update received frame F1 and then transmit the frame. In addition, communication part 202 of second slave 22 receives frame F1 transmitted from communication part 202 of first slave 21, and transmits received frame F1 to communication part 202 of third slave 23.

(3) Calculation of Maximum Transmission Number

Hereinafter, processing of calculating the maximum transmission number in each reference cycle CT0 by calculator 112 will be described.

Calculator 112 calculates the maximum transmission number in each reference cycle CT0 based on a quotient and a remainder when the number of slaves 2 having same update cycle CT1 is divided by a set value. As described above, the maximum transmission number is the maximum value of the number of slaves 2 to which data is capable of being transmitted by frame F1 transmitted from communication device 1 in each reference cycle CT0 among the plurality of slaves 2. Here, the set value is a magnification of update cycle CT1 for reference cycle CT0. Specifically, the set value of each of first slave 21 and second slave 22 is "1", the set value of third slave 23 is "2", and the set value of each of fourth slave 24 and fifth slave 25 is "3".

For the remainder when the number of slaves 2 having same update cycle CT1 is divided by the set value, calculator 112 sets the number of slaves 2 to be added to the maximum transmission number to "1" when the remainder is more than "0", and sets the number of slaves 2 to be added to the maximum transmission number to "0" when the remainder is less than or equal to "0". In addition, for the quotient when the number of slaves 2 having same update cycle CT1 is divided by the set value, calculator 112 sets the obtained value as the number of slaves 2 to be added to the maximum transmission number.

For first slave 21 and second slave 22 having same update cycle CT1, since the number of slaves 2 is "2" and the set value is "1", the quotient is "2" and the remainder is "0". In addition, for third slave 23, since the number of slaves 2 is "1" and the set value is "2", the quotient is "0" and the remainder is "1". In addition, for fourth slave 24 and fifth slave 25 having same update cycle CT1, since the number of slaves 2 is "2" and the set value is "3", the quotient is "0" and the remainder is "2". Therefore, the maximum transmission number calculated by calculator 112 is four (2+1+1). Therefore, frame F1 transmitted from communication device 1 can include data for up to four slaves 2.

In short, calculator 112 calculates the maximum transmission number according to the following function.

Function: maximum transmission number=Σ[integer value of quotient of (number of slaves/set value in each update cycle $CT1$)+if{remainder of (number of slaves/set value in each update cycle $CT1$)>0 then 1 else 0}]

Here, a symbol Σ indicates the sum of update cycles CT1. In addition, the "integer value of the quotient" represents a value of an integer part of the quotient. For example, when the quotient is 2.5, the integer value of the quotient is 2. In addition, in an if function, a value of 1 is obtained when the remainder of (number of slaves/set value in each update cycle CT1) is more than 0, and a value of 0 is obtained when the remainder of (number of slaves/set value in each update cycle CT1) is 0.

Since the maximum transmission number is four as described above, data region D1 in each reference cycle CT0 includes four slots as illustrated in FIG. 3. Hereinafter, details of data region D1 in each reference cycle CT0 will be described.

In first reference cycle CT0, as illustrated in FIG. 3, data region D1 includes slot D11 corresponding to first slave 21, slot D12 corresponding to second slave 22, and slot D13 corresponding to third slave 23. In addition, in first reference cycle CT0, since only data for three slaves 2 is transmitted, one slot D0 is added to frame F1 in order to adjust a frame length to subsequent frame F1. The unused data is stored in slot D0.

In second reference cycle CT0, as illustrated in FIG. 3, data region D1 includes slot D11, slot D12, and slot D14 corresponding to fourth slave 24. In addition, in second reference cycle CT0, similarly to first reference cycle CT0, one slot D0 is included in frame F1. Here, since update cycle CT13 of third slave 23 is set to twice reference cycle CT0, second reference cycle CT0 does not include slot D13.

In third reference cycle CT0, as illustrated in FIG. 3, data region D1 includes slot D11, slot D12, slot D13, and slot D15 corresponding to fifth slave 25. Here, since update cycle CT14 of fourth slave 24 is set to three times reference cycle CT0, third reference cycle CT0 does not include slot D14. In addition, in third reference cycle CT0, since data region D1 includes four slots D11, D12, D13, and D15 for four slaves (maximum transmission number) of first slave 21, second slave 22, third slave 23, and fifth slave 25, data region D1 does not include slot D0.

In fourth reference cycle CT0, as illustrated in FIG. 3, data region D1 includes slot D11 and slot D12. In addition, in fourth reference cycle CT0, two slots DO are added to frame F1. Here, since update cycle CT13 of third slave 23 is set to twice reference cycle CT0 and update cycles CT14 and CT15 of fourth slave 24 and fifth slave 25 are set to three times reference cycle CT0, fourth reference cycle CT0 does not include slots D13, D14, and D15.

In fifth reference cycle CT0, as illustrated in FIG. 3, data region D1 includes slot D11, slot D12, slot D13, and slot D14. Here, since update cycle CT15 of fifth slave 25 is set to three times reference cycle CT0, fifth reference cycle CT0 does not include slot D15. In addition, in fifth reference cycle CT0, since data region D1 includes four slots D11, D12, D13, and D14 for four slaves (maximum transmission number) of first slave 21, second slave 22, third slave 23, and fourth slave 24, data region D1 does not include slot D0.

In sixth reference cycle CT0, as illustrated in FIG. 3, data region D1 includes slot D11, slot D12, and slot D15. In addition, in sixth reference cycle CT0, similarly to first reference cycle CT0, one slot D0 is added to frame F1. Here, since update cycle CT13 of third slave 23 is set to twice reference cycle CT0 and update cycle CT14 of fourth slave 24 is set to three times reference cycle CT0, sixth reference cycle CT0 does not include slots D13 and D14.

Here, although both update cycle CT14 of fourth slave 24 and update cycle CT15 of fifth slave 25 are set to three times reference cycle CT0, as illustrated in FIG. 3, start timings of update cycles CT14 and CT15 are different by reference cycle CT0. That is, in a case where update cycles CT1 of two or more slaves 2 among the plurality of slaves 2 are equal, processor 111 differentiates start timings of update cycles CT1 of two or more slaves 2 by at least reference cycle CT0. Consequently, as compared with a case where the start timings of update cycles CT14 and CT15 are equal, a data amount of the data transmitted in each reference cycle CT0 can be reduced, and as a result, the frame length of frame F1 can be shortened.

(4) Calculation Processing (Calculation of Adjustment Value)

Figure 4:
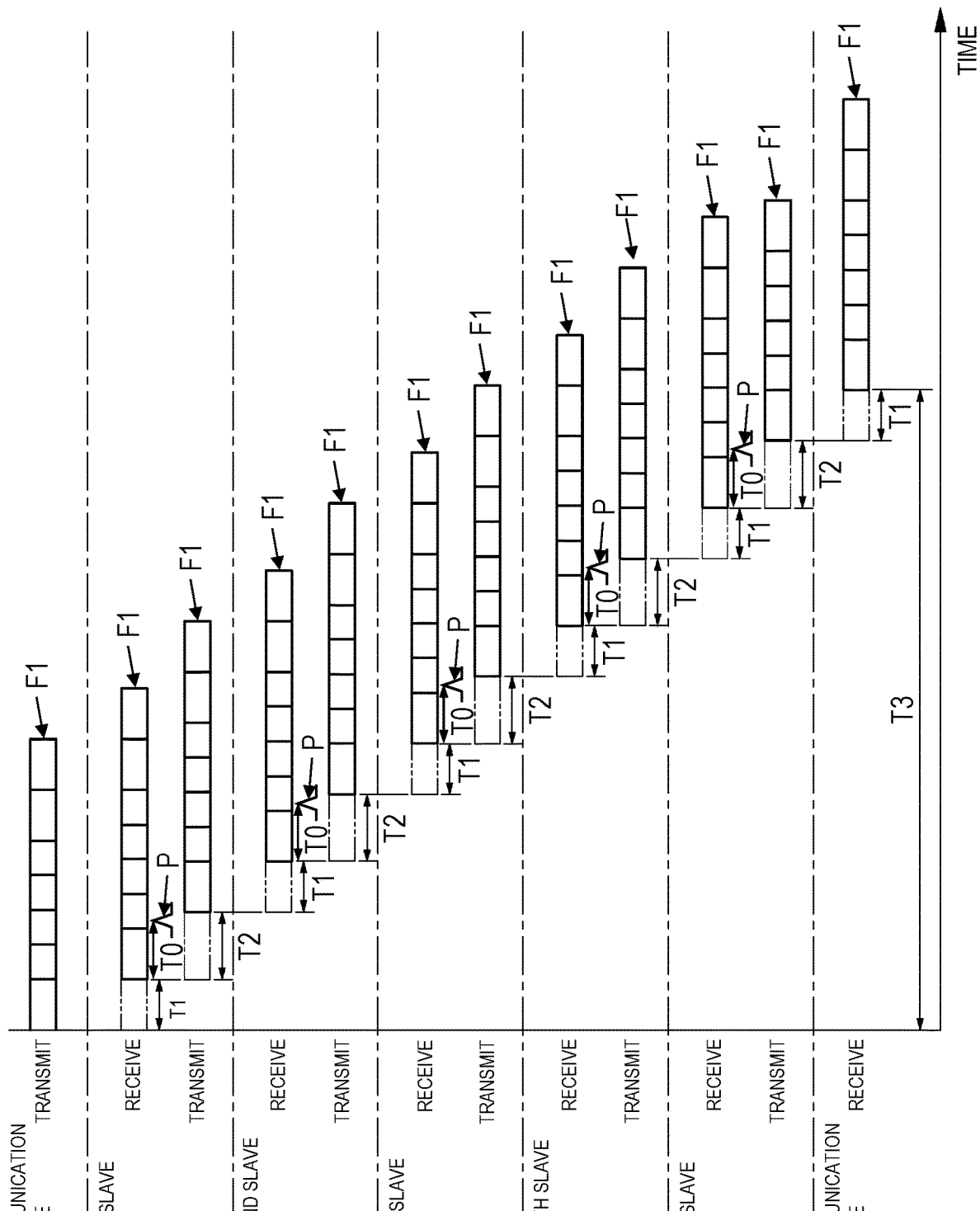
FIG. 4 is an explanatory diagram of an operation timing of the communication system.

Next, calculation processing executed by processor 111 of communication device 1 will be described with reference to FIG. 4. FIG. 4 is an explanatory diagram of an operation timing of communication system 100 according to the present exemplary embodiment. "Time T1" in FIG. 4 is a delay value generated at the time of reception of frame F1, and is the sum of the delay amount of the PHY and the delay amount of the wiring. In addition, "time T2" in FIG. 4 is a delay value generated at the time of transmission of frame F1, and is the internal processing time of each slave 2. In the present exemplary embodiment, the sum of time T1 and time T2 is a fixed delay value. In addition, "time T0" in FIG. 4 represents the first time to be described later. Each slave 2 receives frame F1 and generates synchronization pulse P after T0.

As described above, the calculation processing is processing of calculating the adjustment value (SYNC value) for synchronizing communication device 1 with the plurality of slaves 2. In the calculation processing, processor 111 calculates the adjustment values for the plurality of slaves 2. Here, as described above, the adjustment value is the sum of the first time and the second time. The first time is a processing time from when each of the plurality of slaves 2 receives frame F1 from communication device 1 or slave 2 at the previous stage directly connected to each of slaves 2 to when the synchronization pulse P is generated. In addition, the second time is a product of a difference value between the number of the plurality of slaves 2 and a connection order of each of the plurality of slaves 2 from communication device 1 and a fixed delay value.

Since the number of the plurality of slaves 2 is "5" and the connection order of first slave 21 is "1", the adjustment value of first slave 21 is $\{T0+4\times(T1+T2)\}$. In addition, since the connection order of second slave 22 is "2", the adjustment value of second slave 22 is $\{T0+3\times(T1+T2)\}$. In addition, since the connection order of third slave 23 is "3", the adjustment value of third slave 23 is $\{T0+2\times(T1+T2)\}$. In addition, since the connection order of fourth slave 24 is "4", the adjustment value of fourth slave 24 is $\{T0+(T1+T2)\}$. In addition, since the connection order of fifth slave 25 is "5", the adjustment value of fifth slave 25 is T0.

As described above, in communication system 100 according to the present exemplary embodiment, as the number of slaves 2 connected between each of the plurality of slaves 2 and communication device 1 increases, the delay amount corresponding to the number of slaves is generated, and thus, the adjustment value increases. The delay amount of entire communication system 100 according to the present exemplary embodiment is $T3=(6\times T1+5\times T2)$ as illustrated in FIG. 4. That is, as the number of slaves 2 daisy-chained to communication device 1 increases, the delay amount of entire communication system 100 increases.

Processor 111 includes the adjustment value of each slave 2 calculated in the calculation processing in frame F1 and transmits frame F1 to first slave 21. First slave 21 acquires a corresponding adjustment value among the plurality of adjustment values included in frame F1, and generates a synchronization pulse at a timing based on the adjustment value. In addition, second slave 22 acquires a corresponding adjustment value among the plurality of adjustment values included in frame F1 received from first slave 21, and generates a synchronization pulse at a timing based on the adjustment value. In addition, third slave 23 acquires a corresponding adjustment value among the plurality of adjustment values included in frame F1 received from second slave 22, and generates a synchronization pulse at a timing based on the adjustment value. In addition, fourth slave 24 acquires a corresponding adjustment value among the plurality of adjustment values included in frame F1 received from third slave 23, and generates a synchronization pulse at a timing based on the adjustment value. In addition, fifth slave 25 acquires a corresponding adjustment value among the plurality of adjustment values included in frame F1 received from fourth slave 24, and generates a synchronization pulse at a timing based on the adjustment value. Each of first slave 21, second slave 22, third slave 23, fourth slave 24, and fifth slave 25 performs a predetermined operation (control or detection) in accordance with the generated synchronization pulse. Consequently, in communication system 100 according to the present exemplary embodiment, communication device 1 and the plurality of slaves 2 can be synchronized.

The plurality of adjustment values for the plurality of slaves 2 calculated in the calculation processing are transmitted to each of the plurality of slaves 2 by a SYNC adjustment frame to be described later transmitted from communication device 1.

(5) Operation

Figure 5:
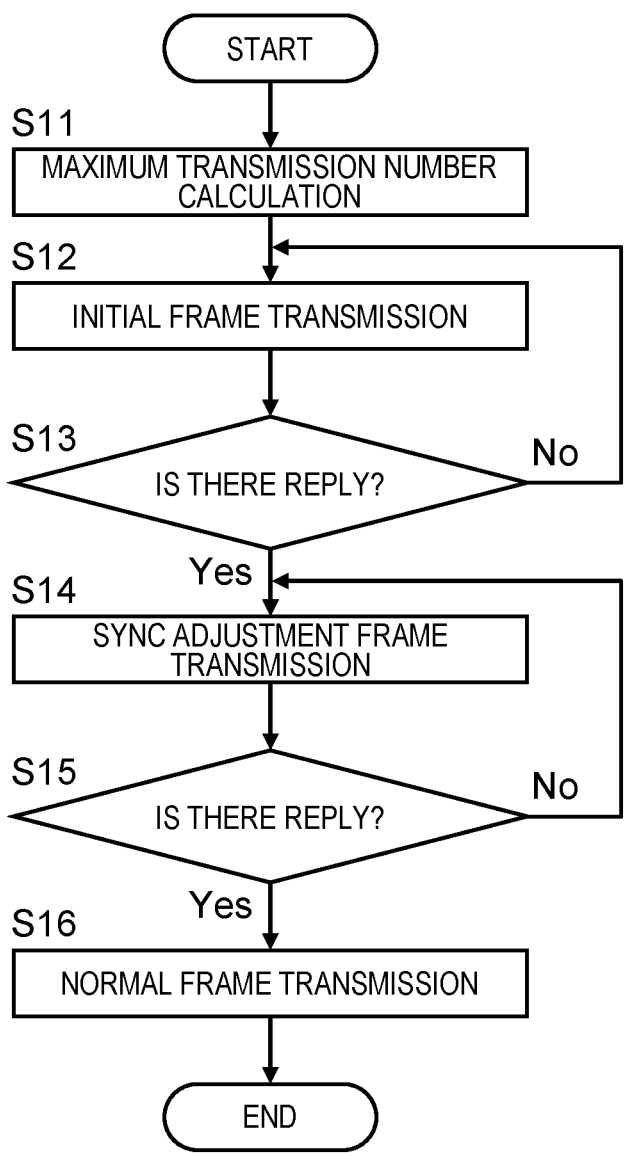
FIG. 5 is a flowchart illustrating an operation of the communication device in the communication system.
Figure 6:
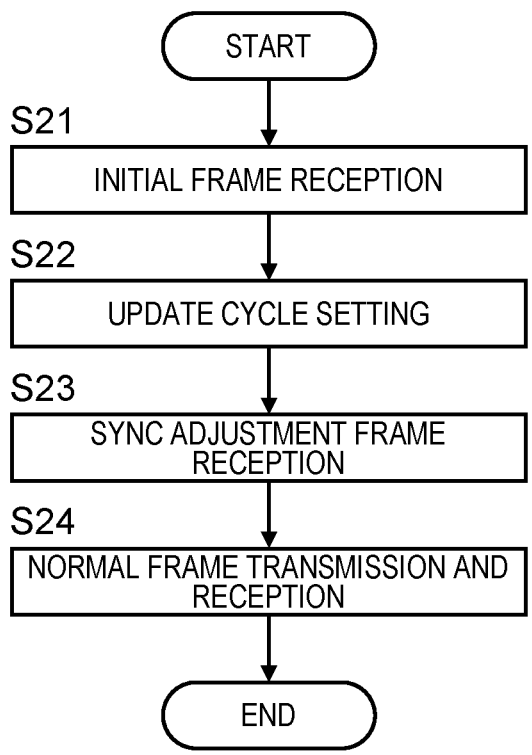
FIG. 6 is a flowchart illustrating an operation of each slave in the communication system.

Next, operations of communication device 1 and each slave 2 constituting communication system 100 according to the present exemplary embodiment will be described with reference to FIGS. 5 and 6.

(5.1) Communication Device

First, an operation of communication device 1 will be described with reference to FIG. 5. FIG. 5 is a flowchart illustrating an operation of communication device 1 in communication system 100 of the present exemplary embodiment.

Calculator 112 of communication device 1 calculates the maximum transmission number of each frame F1 (step S11). In the present exemplary embodiment, as described above, the maximum transmission number is four. That is, in the present exemplary embodiment, data corresponding to four slaves 2 can be included in each frame F1 at the maximum.

Subsequently, communication part 12 of communication device 1 transmits an initial frame to first slave 21 (step S12). The initial frame is a frame transmitted for initial setting of each slave 2. The initial frame includes information on update cycle CT1 corresponding to each slave 2. Update cycle CT1 is set by processor 111 as described above.

Furthermore, controller 11 of communication device 1 determines whether or not communication part 12 has received reply information from fifth slave 25 to the initial frame (step S13). In a case where controller 11 determines that communication part 12 has received the reply information (step S13: Yes), communication part 12 transmits the SYNC adjustment frame to first slave 21 (step S14). The SYNC adjustment frame includes an adjustment value (SYNC value) for synchronizing communication device 1 with the plurality of slaves 2. Note that steps S12 and S13 are repeatedly executed until the reply information from fifth slave 25 is received (step S13: No).

Subsequently, controller 11 of communication device 1 determines whether or not communication part 12 has received the reply information from fifth slave 25 to the SYNC adjustment frame (step S15). In a case where controller 11 determines that communication part 12 has received the reply information (step S15: Yes), communication part 12 transmits corresponding frame F1 in accordance with update cycle CT1 set for each slave 2 (step S16). Note that steps S14 and S15 are repeatedly executed until the reply information from fifth slave 25 is received (step S15: No). Note that, in step S16 of FIG. 5, frame F1 is referred to as a "normal frame".

(5.2) Slave

Next, an operation of each slave 2 will be described with reference to FIG. 6. FIG. 6 is a flowchart illustrating the operation of each slave 2 in communication system 100 of the present disclosure. Hereinafter, among the plurality of slaves 2, first slave 21 at the foremost stage directly connected to communication device 1 will be described as an example.

Communication part 202 of first slave 21 receives the initial frame transmitted from communication device 1 (step S21). Processor 201 of first slave 21 acquires corresponding update cycle CT11 among the plurality of update cycles CT1 included in the initial frame received by communication part 202, and sets acquired update cycle CT11 as update cycle CT11 of the first slave (step S22).

Subsequently, communication part 202 receives the SYNC adjustment frame transmitted from communication device 1 (step S23). Processor 201 acquires a corresponding adjustment value among the plurality of adjustment values (SYNC values) included in the SYNC adjustment frame received by communication part 202, and synchronizes with communication device 1 and other slaves 2 (second slave 22 to fifth slave 25) based on the acquired adjustment value.

Thereafter, communication part 202 receives frame F1 transmitted from communication device 1 in each reference cycle CT0, and transmits frame F1 to second slave 22 directly connected to first slave 21 (step S24). Note that, in step S24 of FIG. 6, frame F1 is referred to as a "normal frame".

(6) Effect

In communication device 1 according to the present exemplary embodiment, as described above, update cycles CT1 (here, first slave 21 and second slave 22) of specific slaves 2 (here, update cycles CT11 and CT12) having shortest update cycle CT1 are set to reference cycle CT0. In addition, in communication device 1, update cycles CT1 (here, update cycles CT13, CT14, and CT15) of other slaves 2 (here, third slave 23, fourth slave 24, and fifth slave 25) different from specific slaves 2 are set to an integral multiple of reference cycle CT0. Consequently, other slaves 2 do not have over-specifications, and communication efficiency can be improved. In addition, in communication device 1 according to the present exemplary embodiment, update cycle CT1 can be divided into specific slaves 2 that require relatively high-speed control and other slaves 2 that do not require relatively high-speed control, and as a result, efficiency of arithmetic processing of communication device 1 can be improved.

Furthermore, in communication device 1 according to the present exemplary embodiment, as described above, in a case where the number of slaves 2 corresponding to the data included in frame F1 is smaller than the maximum transmission number, processor 111 adds the unused data to frame F1. Consequently, the frame lengths of frames F1 can be set to be equal, and as a result, communication device 1 and the plurality of slaves 2 can be synchronized.

In addition, in communication device 1 according to the present exemplary embodiment, as described above, update cycle CT14 of fourth slave 24 and update cycle CT15 of fifth slave 25 are equal. In communication device 1, processor 111 differentiates the start timing of update cycle CT14 and the start timing of update cycle CT15 by reference cycle CT0. Consequently, the frame length of each frame F1 can be shortened as compared with a case where the start timing of update cycle CT14 and the start timing of update cycle CT15 are equal.

(7) Variations

The above-described exemplary embodiment is merely one of various exemplary embodiments of the present disclosure. The above-described exemplary embodiment can be variously changed in accordance with design and the like as long as the object of the present disclosure can be achieved. In addition, functions similar to the functions of communication device 1 may be embodied by a communication control method, a program (computer program), a non-transitory recording medium on which a program is recorded, or the like.

A communication control method according to one aspect is a communication control method used in communication device 1. In communication device 1, the plurality of slaves 2 are daisy-chained and communicate with the plurality of slaves 2. The communication control method includes a setting step. In the setting step, update cycles CT1 of specific slaves 2 which are the slaves having shortest data update cycle CT1 among the plurality of slaves 2 are set to reference cycle CT0, and update cycles CT1 of other slaves 2 different from specific slaves 2 among the plurality of slaves 2 are set to the integral multiple of reference cycle CT0. In addition, a program according to one aspect is a program for causing one or more processors to execute the communication control method.

Hereinafter, variations of the above-described exemplary embodiment will be listed. The variations to be described later can be applied in appropriate combination.

(7.1) First Variation

Figure 7:
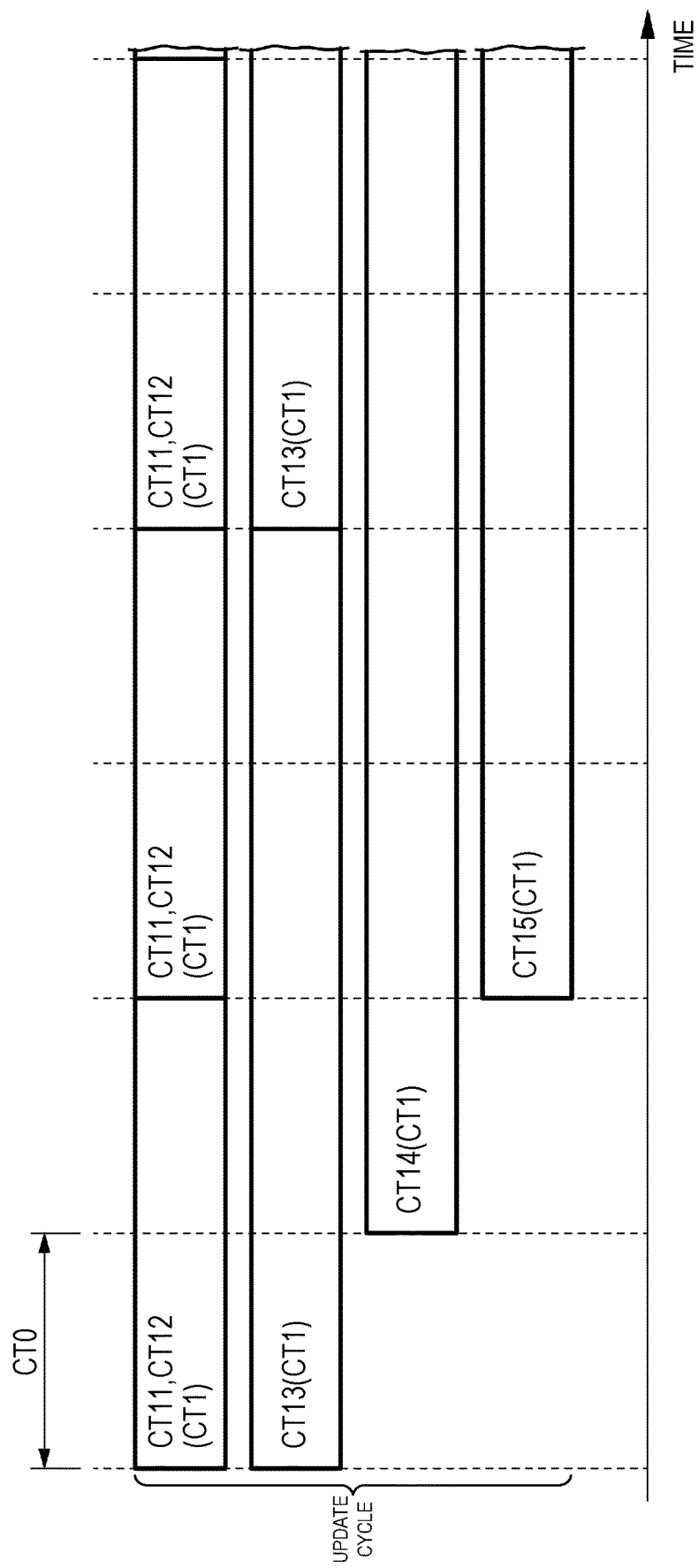
FIG. 7 is an explanatory diagram of an update cycle of each slave in a communication system according to a first variation of the exemplary embodiment.

A communication system according to a first variation will be described with reference to FIG. 7. FIG. 7 is an explanatory diagram of update cycle CT1 of each slave 2 in the communication system according to the first variation of the present exemplary embodiment. The communication system according to the first variation is different from communication system 100 according to the above-described exemplary embodiment in that update cycle CT1 of each slave 2 is set to twice update cycle CT of each slave 2 in communication system 100 according to the above-described exemplary embodiment. The other configurations of the communication system according to the first variation are similar to the configurations of communication system 100 according to the above-described exemplary embodiment, and identical components are denoted by identical reference marks, and the description thereof will be omitted.

In the communication system according to the first variation, as described above, update cycle CT1 of each slave 2 is set to twice update cycle CT1 of each slave 2 in communication system 100 according to the above-described exemplary embodiment.

Specifically, update cycle CT11 of first slave 21 is set to twice reference cycle CT0. That is, update cycle CT11 of first slave 21 in the communication system according to the first variation is set to twice update cycle CT11 of first slave 21 in communication system 100 according to the above-described exemplary embodiment. In addition, update cycle CT12 of second slave 22 is set to twice reference cycle CT0. That is, update cycle CT12 of second slave 22 in the communication system according to the first variation is set to twice update cycle CT12 of second slave 22 in communication system 100 according to the above-described exemplary embodiment.

In addition, update cycle CT13 of third slave 23 is set to four times reference cycle CT0. That is, update cycle CT13 of third slave 23 in the communication system according to the first variation is set to twice update cycle CT13 of third slave 23 in communication system 100 according to the above-described exemplary embodiment. In addition, update cycle CT14 of fourth slave 24 is set to six times reference cycle CT0. That is, update cycle CT14 of fourth slave 24 in the communication system according to the first variation is set to twice update cycle CT14 of fourth slave 24 in communication system 100 according to the above-described exemplary embodiment. In addition, update cycle CT15 of fifth slave 25 is set to six times reference cycle CT0. That is, update cycle CT15 of fifth slave 25 in the communication system according to the first variation is set to twice update cycle CT15 of fifth slave 25 in communication system 100 according to the above-described exemplary embodiment.

In the communication system according to the first variation, communication efficiency can be improved, and efficiency of arithmetic processing of communication device 1 can be improved.

In the communication system according to the first variation, although update cycle CT1 of each of the plurality of slaves 2 is set to a cycle that is twice update cycle CT1 of each of the plurality of slaves 2 in communication system 100 according to the above-described exemplary embodiment, the update cycle is not limited to twice and may be three times or more.

(7.2) Other Variations

Hereinafter, other variations will be listed.

Communication device 1 and slave 2 according to the present disclosure include, for example, a computer system. The computer system mainly includes a processor and a memory as hardware. Functions as communication device 1 and slave 2 according to the present disclosure are implemented by a processor executing a program recorded in a memory of the computer system. The program may be recorded in advance in the memory of the computer system, may be provided through a telecommunication line, or may be provided by being recorded in a non-transitory recording medium such as a memory card, an optical disk, or a hard disk drive readable by the computer system. The processor of the computer system includes one or a plurality of electronic circuits including a semiconductor integrated circuit (IC) or a large scale integration (LSI). The integrated circuit such as an IC or an LSI mentioned here is called differently depending on a degree of integration, and includes integrated circuits called a system LSI, a very large scale integration (VLSI), or an ultra large scale integration (ULSI). Furthermore, a field-programmable gate array (FPGA) programmed after manufacture of LSI, and a logical device capable of reconfiguring a joint relationship in LSI or reconfiguring circuit partitions in LSI can also be used as processors. The plurality of electronic circuits may be aggregated in one chip or may be provided in a distributed manner on a plurality of chips. The plurality of chips may be aggregated in one device or may be provided in a distributed manner in a plurality of devices. The computer system mentioned here includes a microcontroller having one or more processors and one or more memories. Therefore, the microcontroller also includes one or a plurality of electronic circuits including a semiconductor integrated circuit or a large-scale integrated circuit.

In addition, integration of a plurality of functions in communication device 1 into one housing is not essential for communication device 1. The components of communication device 1 may be distributed in a plurality of housings. Furthermore, at least some of the functions of communication device 1 may be implemented by, for example, a cloud (cloud computing) or the like. On the contrary, as in the above-described exemplary embodiment, all the functions of communication device 1 may be integrated into one housing.

In addition, integration of a plurality of functions in slave 2 into one housing is not essential for slave 2. The components of slave 2 may be distributed in a plurality of housings. Furthermore, at least some of the functions of slave 2 may be implemented by, for example, a cloud (cloud computing) or the like. On the contrary, as in the above-described exemplary embodiment, all the functions of slave 2 may be integrated into one housing.

In the above-described exemplary embodiment, processor 111 adds the unused data to frame F1 in a case where the number of slaves 2 corresponding to the data included in frame F1 is smaller than the maximum transmission number. By contrast, in a case where the number of slaves 2 corresponding to the data included in frame F1 is smaller than the maximum transmission number, processor 111 may add the region for storing the device-to-device data to frame F1. That is, the device-to-device data may be stored in slot D0 of frame F1. The device-to-device data is data transmitted and received between any two slaves 2 of the plurality of slaves 2. That is, any one slave of the plurality of slaves 2 (for example, second slave 22) stores the device-to-device data to be transmitted to any one slave 2 of remaining slaves 2 (for example, fourth slave 24) in the region added to frame F1, and transmits frame F1 to next slave 2. Consequently, the frame lengths of frames F1 can be set to be equal, and as a result, communication device 1 and the plurality of slaves 2 can be synchronized. In short, processor 111 synchronizes communication device 1 with the plurality of slaves 2 by adding the region for storing the device-to-device data to frame F1.

In the above-described exemplary embodiment, for fourth slave 24 and fifth slave 25 having same update cycle CT1, the start timing of update cycle CT14 of fourth slave 24 is differentiated from the start timing of update cycle CT15 of fifth slave 25 by reference cycle CT0. By contrast, the start timing of update cycle CT14 of fourth slave 24 and the start timing of update cycle CT15 of fifth slave 25 may be differentiated from each other by twice or more reference cycle CT0.

In addition, in the above-described exemplary embodiment, the start timings of update cycles CT1 are differentiated between two slaves 2 (fourth slave 24 and fifth slave 25) having same update cycle CT1. However, for example, the start timings of update cycles CT1 may be differentiated between three or more slaves 2 having same update cycle CT1. In short, in a case where two or more slaves 2 of the plurality of slaves 2 have same update cycle CT1, processor 111 may differentiate the start timing of update cycles CT1 of two or more slaves 2 by at least reference cycle CT0.

Furthermore, the start timing of update cycle CT14 of fourth slave 24 and the start timing of update cycle CT15 of fifth slave 25 may be equal. In this case, the maximum transmission number in each reference cycle CT0 is five.

In the above-described exemplary embodiment, the adjustment value calculated by processor 111 is the sum of the first time and the second time, but the adjustment value may include, for example, a delay time different from the first time and the second time. In short, the adjustment value may be a value based on the first time which is the processing time from when each of the plurality of slaves 2 receives frame F1 to when the predetermined pulse is generated and the second time which is the product of the difference value between the number of the plurality of slaves 2 and the connection order of each of the plurality of slaves 2 from communication device 1 and the fixed delay value.

Aspects

The present specification discloses the following aspects.

Communication device (1) according to a first aspect is a communication device to which a plurality of slaves (2) are daisy-chained and which communicates with the plurality of slaves (2). Communication device (1) includes processor (111). Processor (111) executes setting processing. In the setting processing, update cycle (CT1) of specific slave (2) that is a slave having shortest data update cycle (CT1) among the plurality of slaves (2) is set to reference cycle (CT0), and update cycle (CT1) of another slave (2) different from specific slave (2) among the plurality of slaves (2) is set to an integral multiple of reference cycle (CT0).

According to this aspect, communication efficiency can be improved.

Communication device (1) according to a second aspect further includes calculator (112) in the first aspect. Calculator (112) calculates a maximum transmission number. The maximum transmission number is a maximum value of the number of slaves (2) to which data is capable of being transmitted by frame (F1) transmitted from communication device (1) in each reference cycle (CT0) among the plurality of slaves (2). Processor (111) adds a region to frame (F1) in a case where the number of slaves (2) corresponding to data included in frame (F1) among the plurality of slaves (2) is smaller than the maximum transmission number calculated by calculator (112). The above region is a region for storing device-to-device data that is data between any two slaves (2) of the plurality of slaves (2).

According to this aspect, the frame lengths of the frames (F1) can be made equal to each other.

In communication device (1) according to a third aspect, in the second aspect, processor (111) synchronizes communication device (1) with the plurality of slaves (2) by adding the region to frame (F1).

According to this aspect, communication device (1) and the plurality of slaves (2) can be synchronized.

In the first aspect, communication device (1) according to a fourth aspect further includes calculator (112). Calculator (112) calculates a maximum transmission number.

The maximum transmission number is a maximum value of the number of slaves (2) to which data is capable of being transmitted by frame (F1) transmitted from communication device (1) in each reference cycle (CT0) among the plurality of slaves (2). Processor (111) adds unused data to frame (F1) in a case where the number of slaves (2) corresponding to data included in frame (F1) among the plurality of slaves (2) is smaller than the maximum transmission number calculated by calculator (112). The unused data is data not used in communication between communication device (1) and the plurality of slaves (2).

According to this aspect, the frame lengths of the frames (F1) can be made equal to each other.

In communication device (1) according to a fifth aspect, in the fourth aspect, processor (111) synchronizes communication device (1) with the plurality of slaves (2) by adding unused data to frame (F1).

According to this aspect, communication device (1) and the plurality of slaves (2) can be synchronized.

In communication device (1) according to a sixth aspect, in any one of the second to fifth aspects, processor (111) further executes calculation processing. In the calculation processing, an adjustment value for synchronizing communication device (1) with the plurality of slaves (2) is calculated. The adjustment value is a value based on a first time and a second time. The first time is a processing time from when each of the plurality of slaves (2) receives frame (F1) to when a predetermined pulse is generated. The second time is a product of a difference value between the number of the plurality of slaves (2) and a connection order of each of the plurality of slaves (2) from communication device (1) and a fixed delay value.

According to this aspect, communication device (1) and the plurality of slaves (2) can be synchronized.

In communication device (1) according to a seventh aspect, in any one of the first to sixth aspects, in a case where update cycles (CT1) of two or more slaves (2) among the plurality of slaves (2) are equal, processor (111) differentiates start timings of update cycles (CT1) of two or more slaves (2) by at least reference cycle (CT0).

According to this aspect, the frame length of each frame (F1) can be shortened.

Communication system (100) according to an eighth aspect includes communication device (1) according to any one of the first to seventh aspects, and a plurality of slaves (2). The plurality of slaves (2) are connected to communication device (1) and communicate with communication device (1).

According to this aspect, communication efficiency can be improved.

A communication control method according to a ninth aspect is a communication control method used in communication device (1). In communication device (1), a plurality of slaves (2) are daisy-chained and communicate with the plurality of slaves (2). The communication control method includes a setting step. In the setting step, update cycle (CT1) of specific slave (2) that is a slave having shortest data update cycle (CT1) among the plurality of slaves (2) is set to reference cycle (CT0), and update cycle (CT1) of another slave (2) different from specific slave (2) among the plurality of slaves (2) is set to an integral multiple of reference cycle (CT0).

According to this aspect, communication efficiency can be improved.

A program according to a tenth aspect is a program for causing one or more processors to execute the communication control method according to the ninth aspect.

According to this aspect, communication efficiency can be improved.

The configurations according to the second to seventh aspects are not essential configurations for communication device (1), and can be appropriately omitted.

INDUSTRIAL APPLICABILITY

The communication device, the communication system, the communication control method, and the program of the present disclosure can obtain a communication device with improved communication efficiency, and are industrially useful.

REFERENCE MARKS IN THE DRAWINGS

1: communication device
2: slave
21: first slave
22: second slave
23: third slave
24: fourth slave
25: fifth slave
100: communication system
111, 201: processor
112: calculator
CT0: reference cycle
CT, CT1, CT11, CT12, CT13, CT14, CT15: update cycle
F1: frame
P: synchronization pulse

The invention claimed is:

1. A communication device to which a plurality of slaves are daisy-chained, the communication device communicating with the plurality of slaves, the communication device comprising:
   a processor that executes setting processing of (i) setting, to a reference cycle, an update cycle of a specific slave that is a slave having a shortest data update cycle among the plurality of slaves and (ii) setting, to an integral multiple of the reference cycle, the update cycle of another slave different from the specific slave among the plurality of slaves, and
   a calculator that calculates a maximum transmission number that is a maximum value of a number of slaves to which data is capable of being transmitted by a frame transmitted from the communication device for each reference cycle among the plurality of slaves, wherein:
   the processor that adds, to the frame, a region for storing device-to-device data that is data between any two slaves of the plurality of slaves in a case where a number of slaves corresponding to data included in the frame among the plurality of slaves is smaller than the maximum transmission number calculated by the calculator,
   the processor further executes calculation processing of calculating an adjustment value for synchronizing the communication device with the plurality of slaves, and
   the adjustment value is a sum of (1) a first time that is a processing time from when each of the plurality of slaves receives the frame to when a predetermined pulse is generated and (2) a second time that is a product of a difference value between a number of the plurality of slaves and a connection order of each of the plurality of slaves from the communication device and a fixed delay value.

2. The communication device according to claim 1, wherein the processor synchronizes the communication device with the plurality of slaves by adding the region to the frame.

3. The communication device according to claim 1, wherein the processor differentiates start timings of the update cycles of two or more slaves by at least the reference cycle in a case where the update cycles of the two or more slaves of the plurality of slaves are equal.

4. A communication system comprising:
   the communication device according to claim 1; and
   a plurality of slaves that are connected to the communication device, and communicate with the communication device.

5. The communication system according to claim 4, wherein the processor adds, to the frame, unused data that is data not used in communication between the communication device and the plurality of slaves in a case where a number of slaves corresponding to data included in the frame among the plurality of slaves is smaller than the maximum transmission number calculated by the calculator.

6. The communication system according to claim 5, wherein the processor synchronizes the communication device with the plurality of slaves by adding the unused data to the frame.

7. The communication system according to claim 4, wherein the processor differentiates start timings of the update cycles of two or more slaves by at least the reference cycle in a case where the update cycles of the two or more slaves of the plurality of slaves are equal.

8. A communication device to which a plurality of slaves are daisy-chained, the communication device communicating with the plurality of slaves, the communication device comprising:
   a processor that executes setting processing of (i) setting, to a reference cycle, an update cycle of a specific slave that is a slave having a shortest data update cycle among the plurality of slaves and (ii) setting, to an integral multiple of the reference cycle, the update cycle of another slave different from the specific slave among the plurality of slaves, and
   a calculator that calculates a maximum transmission number that is a maximum value of a number of slaves to which data is capable of being transmitted by a frame transmitted from the communication device for each reference cycle among the plurality of slaves,
   wherein the processor adds, to the frame, unused data that is data not used in communication between the communication device and the plurality of slaves in a case where a number of slaves corresponding to data included in the frame among the plurality of slaves is smaller than the maximum transmission number calculated by the calculator, and
   the adjustment value is a sum of (1) a first time that is a processing time from when each of the plurality of slaves receives the frame to when a predetermined pulse is generated and (2) a second time that is a product of a difference value between a number of the plurality of slaves and a connection order of each of the plurality of slaves from the communication device and a fixed delay value.

9. The communication device according to claim 8, wherein the processor synchronizes the communication device with the plurality of slaves by adding the unused data to the frame.

10. The communication device according to claim 8, wherein the processor synchronizes the communication device with the plurality of slaves by adding the region to the frame.

11. The communication device according to claim 8, wherein the processor differentiates start timings of the update cycles of two or more slaves by at least the reference cycle in a case where the update cycles of the two or more slaves of the plurality of slaves are equal.

12. A communication control method used in a communication device to which a plurality of slaves are daisy-chained, the communication device communicating with the plurality of slaves, the method comprising:
   setting, to a reference cycle, an update cycle of a specific slave that is a slave having a shortest data update cycle among the plurality of slaves and setting, to an integral multiple of the reference cycle, the update cycle of another slave different from the specific slave among the plurality of slaves;
   calculating a maximum transmission number that is a maximum value of a number of slaves to which data is capable of being transmitted by a frame transmitted from the communication device for each reference cycle among the plurality of slaves; and
   adding, to the frame, a region for storing device-to-device data that is data between any two slaves of the plurality of slaves in a case where a number of slaves corresponding to data included in the frame among the plurality of slaves is smaller than the maximum transmission number.

13. The communication control method according to claim 12, further comprising:
   synchronizing the communication device with the plurality of slaves by adding the region to the frame.

14. The communication control method according to claim 12, further comprising:
   adding, to the frame, unused data that is data not used in communication between the communication device and the plurality of slaves in a case where a number of slaves corresponding to data included in the frame among the plurality of slaves is smaller than the maximum transmission number.

15. The communication control method according to claim 14, further comprising:
   synchronizing the communication device with the plurality of slaves by adding the unused data to the frame.

16. The communication control method according to claim 12, further comprising:
   calculating an adjustment value for synchronizing the communication device with the plurality of slaves, wherein the adjustment value is a sum of (1) a first time that is a processing time from when each of the plurality of slaves receives the frame to when a predetermined pulse is generated and (2) a second time that is a product of a difference value between a number of the plurality of slaves and a connection order of each of the plurality of salves from the communication device and a fixed delay value.

17. The communication control method according to claim 12, further comprising:
   differentiating start timings of the update cycles of two or more slaves by at least the reference cycle in a case where the update cycles of the two or more slaves of the plurality of slaves are equal.

* * * * *